US006276511B1

(12) United States Patent
Iredi et al.

(10) Patent No.: US 6,276,511 B1
(45) Date of Patent: Aug. 21, 2001

(54) APPARATUS FOR THE ALIGNMENT AND DEPOSITING OF ELONGATE PARTICLES SUCH AS WOOD CHIPS, WOOD FIBERS OR THE LIKE ON A CONTINUOUSLY MOVED SUPPORT

(75) Inventors: Hans-Joachim Iredi; Hubertus Japes, both of Bad Muender (DE)

(73) Assignee: Kvaerner Panel Systems GmbH Maschinen- und Anlagenbau, Springe (DE)

( * ) Notice: Subject to any disclaimer, the term of this patent is extended or adjusted under 35 U.S.C. 154(b) by 0 days.

(21) Appl. No.: 09/403,172

(22) PCT Filed: Apr. 20, 1998

(86) PCT No.: PCT/EP98/02313

§ 371 Date: Jan. 5, 2000

§ 102(e) Date: Jan. 5, 2000

(87) PCT Pub. No.: WO98/47678

PCT Pub. Date: Oct. 29, 1998

(30) Foreign Application Priority Data

Apr. 21, 1997 (DE) .......................................... 297 07 143 U

(51) Int. Cl.[7] .................................................... B65G 47/24

(52) U.S. Cl. .......................... 198/382; 198/532; 198/560; 425/83.1; 264/108

(58) Field of Search ..................................... 198/382, 383, 198/532, 560, 392; 425/83.1; 264/108; 156/62.2

(56) References Cited

U.S. PATENT DOCUMENTS 2,931,076 * 4/1960 Clark .................................... 198/382
3,680,175 * 8/1972 Kamp et al. ......................... 198/382
4,058,201 * 11/1977 Etzold .................................. 198/832
4,494,919 1/1985 Knudson .
4,505,663 3/1985 Kilpela .

FOREIGN PATENT DOCUMENTS

2523515A1 1/1976 (DE) .
2734403A1 9/1978 (DE) .
3731322A1 3/1988 (DE) .
3731322 * 3/1988 (DE) ..................................... 198/382
19544866A1 6/1997 (DE) .

* cited by examiner

*Primary Examiner*—Christopher P. Ellis
*Assistant Examiner*—Mark A. Deuble
(74) *Attorney, Agent, or Firm*—Townsend and Townsend and Crew LLP

(57) ABSTRACT

The invention relates to a device for aligning and depositing elongate particles covered with at least one bonding agent on a continuously moving support so as to form a non-woven fabric for the subsequent production of boards. Said device comprises a dosing hopper, a unit for transferring the particles to an orientation unit consisting of several rollers having several compartments, said rollers being arranged at a distance from each other on a horizontal surface and at right angles to the direction of displacement of the continuously moving support. The alignment faces of the rollers, whose surfaces define the compartments and are embodied in an airtight manner, are configured in such a way that, at least in the area of their free ends, they are curved and/or bent against the direction of displacement of the continuously moving support.

13 Claims, 2 Drawing Sheets

Figure 1:
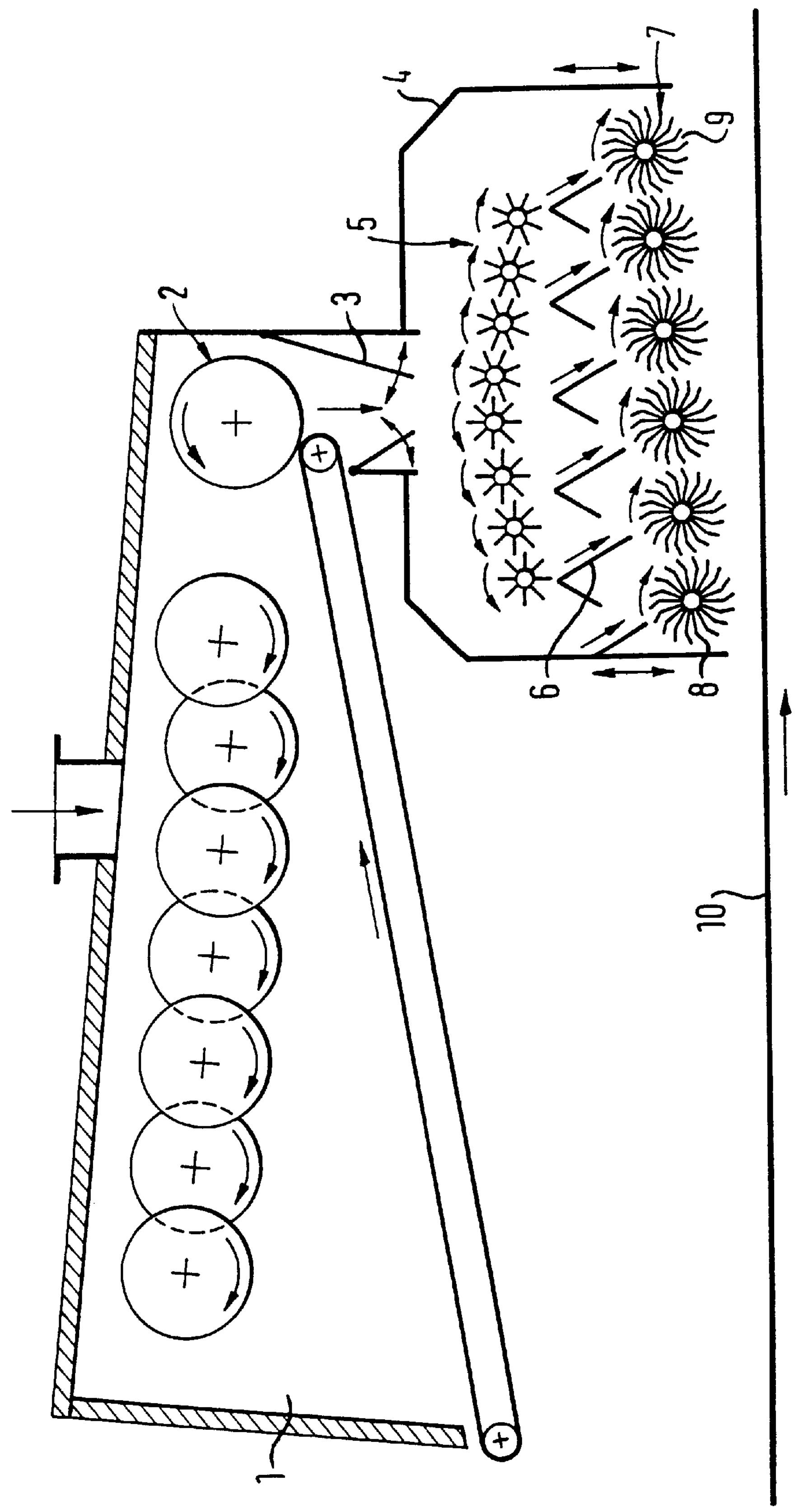

APPARATUS FOR THE ALIGNMENT AND DEPOSITING OF ELONGATE PARTICLES SUCH AS WOOD CHIPS, WOOD FIBERS OR THE LIKE ON A CONTINUOUSLY MOVED SUPPORT

The invention relates to an apparatus for the alignment and depositing of elongate particles containing lignocellulose and/or cellulose and provided with at least one binder, such as wood chips, wood fibers or the like, on a continuously moved support to form a mat for the subsequent manufacture of boards, comprising a metering hopper containing such particles, a unit for the transfer of the particles to an orientation unit which is arranged above a continuously moved support, with the spacing between the orientation unit and the continuously moved support lying higher than the upper side of the mat to be formed.

An apparatus is known from the German patent specification 27 34 403 which serves for the alignment of particles (strands) containing lignocellulose and provided with a binder, such as wood chips, wood fibers or the like, which, having been brought onto a continuously moved support, form a mat, the particles of which are aligned substantially parallel to one another and also extend in the direction of movement or transverse to the direction of movement of the continuously moved support, the apparatus comprising a plurality of thin guide surfaces the mutual, equal spacings of which are smaller than the length of the particles to be aligned and the lower edges of which lie higher than the upper side of the mat to be formed and which are movable such that each guide surface is movable in the opposite direction relative to the two adjacent guide surfaces. A plurality of mutually spaced apart projections protrudes beyond the upper marginal edge of each guide surface in the same plane, with the thickness of the projections being the same as the thickness of the guide surface. These projections are formed as regular squares with two parallel edges and an upwardly disposed upper edge parallel to the marginal edge and/or as triangles with an upwardly disposed point. In this way a situation is admittedly achieved in which those particles which first bridge the upper edges of two or more moving guide surfaces are turned in an arc and then drop onto the continuously moved support aligned parallel to one another between the guide surfaces; however, there exists at least the danger of blockages and the danger of damage to the particles.

A differently constructed device for the alignment of wood particles (strands) over the transverse width of a moved support is known from the German laying open print 2 523 515. This device includes a pre-orientation unit which has a plurality of upright ribs and also a drum with wooden strand orientation guides mounted on its outer sheet metal periphery and a capture device which holds the wooden strands captured between an arc-like jacket and a plurality of spaces, each formed by the peripheral surface of the drum and a pair of sheet metal guide surfaces, until they are released at a predetermined point in order to be able to fall aligned parallel to one another onto a moved support on which they are deposited transverse to its direction of movement. The throughput and the degree of orientation of the particles are however not satisfactory with this arrangement.

The invention is based on the object of so designing an alignment apparatus of the initially named kind that the degree of orientation of the particles can be improved with a high throughput and without damaging the particles, with disturbance-free operation.

In accordance with a first embodiment of the invention provision is made for solving the underlying object that the orientation unit consists of a plurality of compartmented rolls arranged spaced apart at right angles to the direction of the movement of the continuously moved support in an at least substantially horizontal plane and rotating opposite to the direction of movement of the continuously moved support, the alignment surfaces of the compartmented rolls which bound the individual compartments and are made air-impermeable being of curved and/or angled design opposite to the direction of movement of the continuously moved support at least in the region of their free ends.

In accordance with the second embodiment of the invention the solution of the underlying object takes place in that the orientation unit has a plurality of mutually parallel vertical alignment surfaces arranged over the width of the support in the direction of movement of the continuously moved support, with projections projecting beyond their upper marginal edges and with respective neighbouring alignment surfaces being drivable in the opposite direction in such a way that each alignment surface executes superimposed movements both with respect to their longitudinal extent and also perpendicular thereto.

Figure 2:
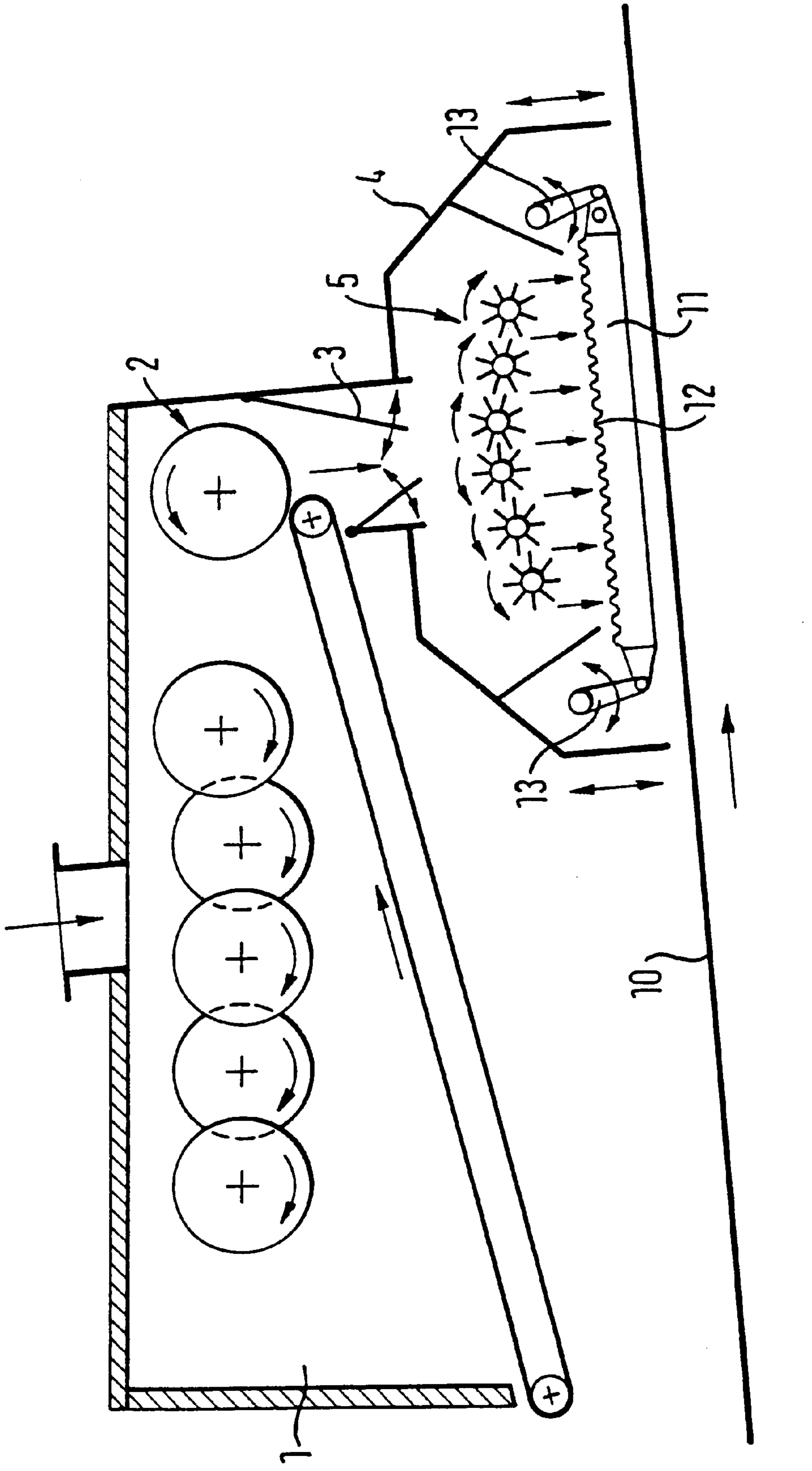

Particularly advantageous embodiments of the subject of the invention are set forth in the subordinate claims and will be explained with reference to the following description of embodiments and to the drawing in which are shown:

FIG. 1 a schematic representation of a first embodiment of the invention with a plurality of compartmented rolls, and FIG. 2 a schematic illustration of a second embodiment of the invention with a plurality of flat strip-like alignment surfaces.

FIG. 1 shows a metering hopper 1 which can be executed in conventional manner and has, in addition to a floor-side transport belt and rearward scraping rolls, a supply unit 2 by means of which the glued elongate particles containing lignocellulose and/or cellulose are supplied via pendulum flaps 3 to a group of separation rolls 5 provided in an orientation unit 4 surrounded by a housing.

The separation rolls 5 extend over the width of a moved support 10 on which the respective mat is formed. A first group of the separation rolls 5 is driven in the counterclockwise sense and a second group in the clockwise sense so that the particle material supplied via the supply unit 2 is uniformly distributed and falls correspondingly uniformly onto a group of compartmented rolls 7 which are arranged beneath the group of separation rolls 5 and are rotationally driven opposite to the direction of movement of the moved support 10. Sheet metal guides 6 extending obliquely relative to the vertical are provided between the separation rolls 5 and the compartmented rolls 7 and ensure that the compartmented rolls 7 are intentionally supplied in their upper region where the compartments 9 open towards the separation rolls 5.

The compartmented rolls 7 have a plurality of alignment surfaces 8 which are made impermeable to air and which have a mutual spacing such that only so much particle material can be accommodated in a compartment 9 that a full alignment of the elongate particles can be ensured.

The alignment surfaces 8 are so designed that they first give up the picked-up elongate particles from the compartments 9 again, the particles having been aligned as a result of the compartmental structure transverse to the direction of movement of the support 10 when the drop path of the particles between the compartmented roller 7 and the moved support 10 or the mat formed on this moved support 10 is minimized.

This is achieved by the special shaping of the alignment surfaces 8 which brings about a retention effect with respect to the elongate particles and only allows the elongate aligned particles to leave the respective compartment 9, i.e. to slide out of this compartment, when the relevant compartment 9 is located in a lower position or a position close to the mat. For this purpose the alignment surfaces 8 are curved and/or angled, at least in the region of their free ends, opposite to the direction of rotation of the compartmented rolls 7. Depending on the practical circumstances the alignment surfaces can be continuously curved, curved with the radius of curvature reducing towards the free end or also only curved in the region of the free ends. Instead of a continuous curvature provision can also be made for the alignment surfaces 8 to be kinked, especially multiply kinked so that a plurality of flat part surfaces is present which are connected together via kink positions and which resemble a curved structure in polygon-like manner.

The orientation unit 4 surrounded by a housing is preferably made vertically adjustable with respect to the moved support 10, as indicated by double arrows. The axes of the compartmented rolls 7, which are made identical to one another, preferably lie in a plane which has a course relative to the moved support 10 which at least substantially corresponds to the rising angle of the mat formed on the support 10.

The embodiment of FIG. 2 is distinguished from the embodiment of FIG. 1 in that a group of alignment surfaces 11 is arranged beneath the separation rolls 5 instead of the group of compartmented rolls 7. These alignment surfaces 11 have a mutual spacing relative to one another which is smaller than the longitudinal extent of the particles to be aligned. In this connection so many alignment surfaces 11 arranged parallel to one another are provided that particles coming from the supply unit 2 can only reach the support 10 via the arrangement of alignment surfaces 11 which extends over the full width of the moved support 10.

The alignment surfaces 11 must ensure that the particles which reach the alignment surfaces 11 without orientation via the separating rolls 5 are so orientated that they extend parallel to the direction of movement of the support 10 and reach this support 10 correspondingly aligned. For this purpose the alignment surfaces 11 are, on the one hand, set in motion and are, on the other hand, provided with projections 12 at their upper side so that corresponding alignment forces can be exerted onto the particles.

In the context with the invention it is of importance in this connection that the alignment surfaces 11 not only execute a movement parallel to the moved support 10 but rather these alignment surfaces 11 always also have components of movement perpendicular to this support 10, since in this manner the alignment effect, i.e. the degree of orientation can be decisively improved and the performance of the overall apparatus is also correspondingly increased.

In accordance with the embodiment shown in FIG. 2 the alignment surfaces 11 arranged alongside one another, of which the neighbouring alignment surfaces 11 are always driven in opposite senses, are pivotally connected at their ends to pivot arms 13 and this pivotal arrangement lead to the alignment surfaces 11 executing a swing-like movement, i.e. a movement with horizontal and vertical components of movement. In order to allow the movements of the alignment surfaces 11 which bring about the alignment of the particles to become ideally effective the alignment surfaces 11 are provided with friction increasing projections 12 at their upper side.

These projections 12 can be made wave-like or arcuate, but can also have the shape of triangles, rectangles, trapeziums and the like, with edges of the projections preferably being rounded in order to ensure a careful and damage-free treatment of the particles.

What is claimed is:

1. Apparatus for the alignment and depositing of elongate particles containing lignocellulose and/or cellulose and provided with at least one binder, such as wood chips, wood fibers or the like, on a continuously moved support (10) to form a mat for the subsequent manufacture of boards, comprising a metering hopper (1) containing such particles, a unit (2) for the transfer of the particles to an orientation unit (4) which is arranged above a continuously moved support (10), with the spacing between the orientation unit (4) and the continuously moved support (10) lying higher than the upper side of the mat to be formed and with the orientation unit (4) consisting of a plurality of compartmented rolls (7) arranged spaced apart at right angles to the direction of the movement of the continuously moved support (10) in an at least substantially horizontal plane and rotating opposite to the direction of movement of the continuously moved support (10), the alignment surfaces (8) of the compartmented rolls which bound the individual compartments (9) and are made air-impermeable being of curved and/or angled design opposite to the direction of movement of the continuously moved support (10) at least in the region of their free ends.

2. Apparatus for the alignment and depositing of elongate particles containing lignocellulose and/or cellulose and provided with at least one binder, such as wood chips, wood fibers or the like, on a continuously moved support (10) to form a mat for the subsequent manufacture of boards, comprising a metering hopper (1) containing such particles, a unit (2) for the transfer of the particles to an orientation unit (4) which is arranged above a continuously moved support (10), with the spacing between the orientation unit (4) and the continuously moved support (10) lying higher than the upper side of the mat to be formed and with the orientation unit (4) having a plurality of mutually parallel vertical alignment surfaces (11) arranged over the width of the support (10) in the direction of movement of the continuously moved support (10), with projections projecting beyond their upper marginal edges and with respective neighbouring alignment surfaces being drivable in the opposite direction in such a way that each alignment surface (10) executes superimposed movements both with respect to their longitudinal extent and also perpendicular thereto.

3. Apparatus in accordance with claim 1, characterized in that the free ends of the alignment surfaces (8) extend at an angle of 30° to 70° to a radial plane passing through their foot-point.

4. Apparatus in accordance with claim 1, characterized in that the alignment surfaces are continuously curved and that the radius of curvature is smaller in the region of the free ends of the alignment surfaces (8).

5. Apparatus in accordance with claim 1, characterized in that the alignment surfaces (8) consist of a plurality of flat part surfaces which merge into one another via kinked positions.

6. Apparatus in accordance with claim 1, characterized in that the individual adjacently disposed compartmented rolls (8) have, in the direction of movement of the continuous support (10), an increasing spacing from the moved support (10) corresponding to the mat build-up.

7. Apparatus in accordance with claim 1, characterized in that the speed of rotation of the compartmented rolls (7) is adjustable.

8. Apparatus in accordance with claim 2, characterized in that the alignment surfaces (11) are in each case pivoted at both ends on pivot arms (13) and are drivable in swing-like manner.

9. Apparatus in accordance with claim 8, characterized in that the projections provided at the upper side of the alignment surfaces (11) consist of an alternating sequence of raised portions and recesses.

10. Apparatus in accordance with claim 8, characterized in that the projections (12) lead to a corrugated structure at the top side of the alignment surfaces (11).

11. Apparatus in accordance with claim 8, characterized in that the projections (12) have triangular, rectangular or diamond-shape with preferably rounded corners.

12. Apparatus in accordance with claim 2, characterized in that the alignment surfaces (11) are mounted such that they extend at an angle corresponding to their longitudinal extent relative to the moved support (10), the angle corresponding essentially to the course of the mat surface building up on the support (10).

13. Apparatus in accordance with claim 1, characterized in that the housing surrounding the orientation unit (4) and carrying all the functional units arranged in it is made vertically adjustable relative to the moved support (10).

* * * * *